July 5, 1938. C. L. EKSERGIAN ET AL 2,123,099
REINFORCED SPOKE ARTILLERY WHEEL
Filed April 4, 1932
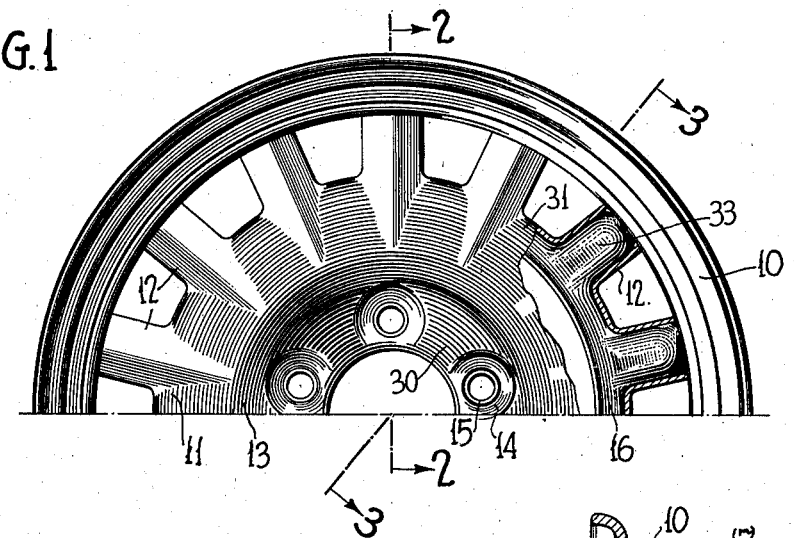
FIG.1
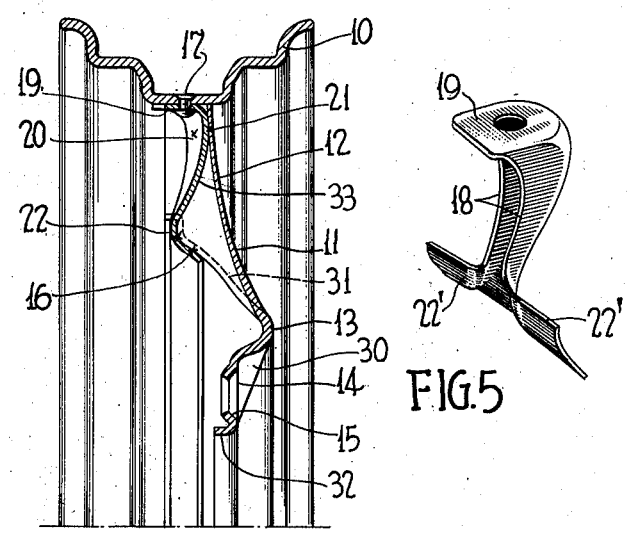
FIG.2
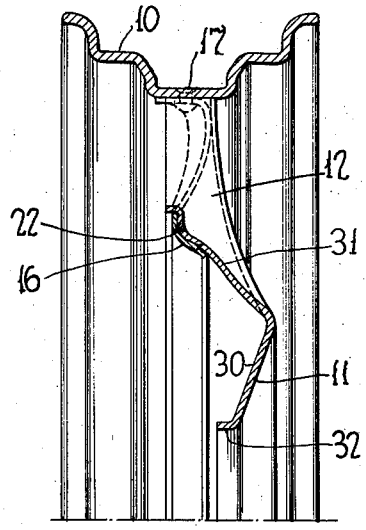
FIG.3
FIG.5
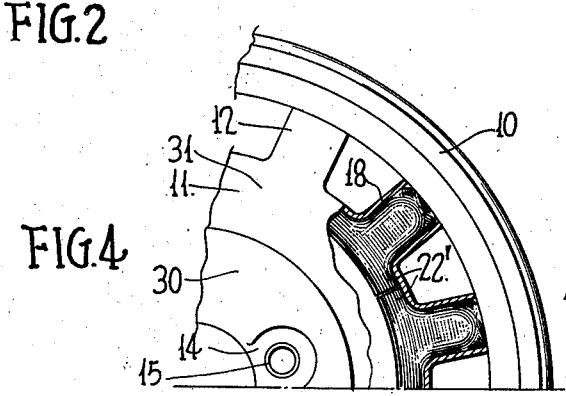
FIG.4
INVENTOR.
CAROLUS L. EKSERGIAN &
PAUL W. GAENSSLE
BY John P. Fairbox
ATTORNEY.

Patented July 5, 1938

2,123,099

UNITED STATES PATENT OFFICE 2,123,099

REINFORCED SPOKE ARTILLERY WHEEL

Carolus L. Eksergian and Paul W. Gaenssle, Detroit, Mich., assignors to Budd Wheel Company, Philadelphia, Pa., a corporation of Pennsylvania Application April 4, 1932, Serial No. 603,087

9 Claims. (Cl. 301—9)

This invention relates to vehicle wheels and more particularly to wheels of the single stamping artillery type and has for its principal object the fabrication of a very strong wheel body.

This invention will be better understood from the following description when considered in connection with the accompanying drawing and its scope will be pointed out in the appended claims.

In the accompanying drawing wherein like numerals represent corresponding parts in the various figures, Figure 1 is a side elevation of the upper half of a wheel constructed in accordance with our invention.

Figure 2 is a cross section on the line 2—2 of Fig. 1 showing a section through a spoke.

Figure 3 is a cross section on the line 3—3 of Fig. 1 showing a section between the spokes.

Figure 4 is a sectored elevation similar to Fig. 1 partially broken away to show a modification, and Figure 5 shows one of the modified reinforcing or stiffening arms.

We have shown our wheel as comprising a single stamping main body portion and a rim mounted thereon.

The main body 11 comprising an integral nave and spoke portion is made from a tapered disc or other sheet metal member. The disc has the customary taper this being preferable, although not a necessity and is formed of substantially double frustro-conical section. The inner cone or mounting portions of the hub detachable type 30 has its apex axially inwardly of the main wheel body whereas the outer conical section or nave 31 has its apex axially outwardly of the main wheel body. The inner radial extremity 32 of the disc is turned abruptly axially inwardly to form a seat against the hub flange. The conical section 30 includes a portion commonly called the bolting on circle comprising a plurality of openings suitable for the reception of studs secured to the hub flange. The inner cone comprising this portion of the wheel body is composed of the thick portion of the disc giving a very strong construction desirable in wheels of the demountable type. The hub securing zone of the wheel has a plurality of indentations 14 having bolt holes making substantial planes and having coined centrally thereof seats 15 about the bolt holes for the reception of semi-spherical securing nuts.

The general angular construction between the areas occupied by the consecutive bolt holes gives a substantial truss formation capable of withstanding large axial impact loads. The intersecting area of the double conical section results in a substantially annular portion 13 on the main wheel body. Radially outwardly of the annular portion 13 the main wheel body is pressed or stamped to form a spoked portion 12 the roots of which merge into the conical area 31, the innermost radial extremities of the same terminating substantially at the zone 13. The desirable characteristics of the conical section 31 are somewhat diminished by the corrugated periphery of the same in the spokes thus tending to destroy that strength and other characteristics which it has been so desirable to attain.

The spoked portion 12 of the wheel body comprises a plurality of individual spokes of substantially U-shaped transverse cross section. The outer axial projection of the spokes results in an arc of large radius merging into the conical portion of high section modulus. The back portion of the U-shaped spokes is of short radial extent being complementary to the nave of large radius. The necessary merging of these two bodies results in a filleted area of substantially large radius.

To regain the desirable characteristics of the conical section which are apparently reduced, and at the same time to give the spoked section greater resistance to weaving, a reinforcing member 16 of substantially artillery type is used. The substantially annular portion of the member 16 is telescoped within and suitably secured to the conical section 31 adjacent the periphery thereof as at 22 by spot welding, riveting or in any other suitable manner. The spoked portions 33 of the artillery member are flanged axially as at 18 for suitable reception within the spoke portions of the main wheel body which may or may not include entire or partial press fitting. The axially and radially extending flanges 18 provide suitable securing surfaces and are entirely concealed from view within the spoke members 12. Co-extensive securement of the spoke portions of the reinforcing member is obtained by means of spot welding, for instance, as indicated at 20 and 21. The outermost radial extremities of the reinforcing member are turned axially inwardly as indicated at 19 providing a flange, which complementary to the outermost portion of the spoke, provides a seat, for the rim 10 shown as of the drop center type. The axial flange 19 may be as shown in Fig. 2 of considerable axial extent or it may be foreshortened ending adjacent the main spoke body. Suitable fastening, for example, rivets 17 provide the necessary driving connections at this part of the wheel.

The nested relation of the reinforcing member is readily observed in either Figs. 1 and 4 in the broken away portions.

A modification of the structure hereinbefore described is shown in Figs. 4 and 5 wherein the annular section of the reinforcing member is broken forming a plurality of wing-shaped elements 22' capable of securement to the conical section of the nave. The construction thus obtained is of substantial form throughout the wheel body.

What we claim is:

1. An artillery type vehicle wheel comprising in combination, a rim member, a single stamping wheel body of the demountable bolted on type having a substantially radial bolting on flange, a spoke bearing portion extending radially outwardly thereof having a conical disc like form, spokes having their root portions pressed from said conical portion and their main bodies extending therebeyond, a conical portion connecting said flange and spoke bearing portion forming with the latter a substantially annular channel facing axially, and reinforcing means secured to the outer periphery of said spoke bearing portion between the spokes and having axial interlocking relation with said spokes and terminating in axial flanges secured to said rim portion.

2. A vehicle wheel including, in combination, a single stamping main body member consisting of a nave portion and spoke portions, and a plurality of reinforcing and stiffening arms interconnecting said nave portion and said spoke portions, said reinforcing arms being flanged at opposite side edges and having their flanged sides press fitted into the respective spokes and terminating outwardly in substantially axially extending rim seats, said arms further characterized by oppositely extending wing portions arranged to be secured to the wheel body member nave portion at either side of a spoke.

3. A vehicle wheel including, in combination, a single stamping main body member consisting of a nave portion and spoke portions, and a plurality of reinforcing and stiffening arms interconnecting said nave portion and said spoke portions, said reinforcing arms being flanged at opposite side edges and secured to the respective spokes through said side edges and terminating outwardly in substantially axially extending rim seats, said arms further characterized by flange portions arranged for securement to the nave periphery at each side of the respective spokes.

4. A vehicle wheel including, in combination, a single stamping main body member consisting of a nave portion and spoke portions, a plurality of reinforcing and stiffening arms interconnecting said nave portion and said spoke portions, said arms being continued radially outwardly throughout the length of the spoke and flanged axially inwardly at their outermost radial extremities, and a rim member mounted upon the outermost radial extremities of said spokes and secured to the axially extending flanges of said arms, said arms further characterized by flange portions arranged for securement to the nave periphery at each side of the respective spokes.

5. A vehicle wheel including, in combination, a single stamping main body member consisting of a nave portion and spoke portions, said main body member having a single load supporting hub support, and a plurality of reinforcing and stiffening arms interconnecting said nave portion and said spoke portions, said reinforcing arms being flanged at opposite side edges and having their flanged sides press fitted into the respective spokes and terminating outwardly in substantially axially extending rim seats, said arms further characterized by oppositely extending wing portions arranged to be secured to the wheel body member nave portion at either side of a spoke.

6. An artillery wheel body including a single sheet metal stamping adapted to transmit substantially all of the wheel load between a hub element and a rim element, said stamping comprising a nave including a mounting portion from which the wheel body extends freely to the rim element and a spoke-bearing portion supported solely by and arranged radially outwardly of said mounting portion, said spoke-bearing portion having a relatively large diameter as compared to the outer peripheral diameter of said mounting portion and having its radially outer areas deeply dished axially in one and the same general direction, said nave being so constructed and arranged as to provide a single dished load-supporting disc and short hollow-sectioned spoke formations having roots pressed from said areas with the hollow cross sections of their bodies in open communication with the interior of said areas thereby interrupting portions of said areas, said spoke formations being constructed and arranged to stiffen said areas to thereby measurably compensate for impairment of strength through said interruption, and an annulus connected to the inner surface of the radially outer areas of the spoke-bearing portion and thereby restoring the continuity of such areas, said annulus having radially extending arms aligning with and secured to the spoke formations and terminating at their outer extremities in rim seats.

7. In a combined disc and artillery wheel, a wheel body including a bolting-on flange adapted for attachment to a hub element and extending freely from said bolting-on flange to a rim element, said wheel body comprising a single stamping adapted to take substantially the entire load between the rim element and the hub element, said stamping including a bolting-on flange portion and having three annular zones, the inner zone comprising a dished disc portion of substantial radial extent, the outer zone comprising short hollow section spokes of high section modulus and the intermediate zone constituting a merger between the inner disc and the outer spoke zones in which the spokes have roots pressed from a prolongation of the inner disc zone and through which the spokes open radially inwardly, said intermediate zone having an axial extent greater than the axial depth of the spokes and being reinforced by said spokes, the radially outer extremity of the intermediate zone being at least midway from the outer periphery of the bolting-on flange portion to the outer periphery of the stamping, and an annular reinforcing plate tying together the portions of the intermediate zone between the spokes, said annulus having radially extending arms aligning with and secured to the spokes and terminating at their outer extremities in rim seats.

8. An artillery wheel body including a single stamping adapted to transmit substantially all of the wheel load between a hub element and a rim element, said stamping comprising a nave including a mounting portion from which the wheel body extends freely to the rim element, a generally axially extending portion projecting freely from the periphery of said mounting portion, and a spoke-bearing portion extending from the end of said generally axially-extending portion removed from said mounting portion and at least partially overlying said generally axially-extending portion and terminating in an outer peripheral edge of relatively large diameter as compared to the outer peripheral diameter of said mounting portion and having its radially outer areas deeply dished axially in one and the same general direction from said peripheral edge, said nave being so constructed and arranged as to provide a single-dished-load-supporting disc in operation, and short hollow-sectioned spoke formations having roots pressed from said areas with the hollow cross-sections of their bodies in open communication with the interior of said areas thereby interrupting portions of said areas, said spoke formations being constructed and arranged to stiffen said areas to thereby measurably compensate for impairment of strength through said interruption, and an annulus connected to the inner surface of the radially outer areas of the spoke-bearing portion and thereby restoring the continuity of such areas, said annulus having radially extending arms aligning with and secured to the spoke formations and terminating at their outer extremities in rim seats.

9. A combined disc and artillery wheel body comprising a single stamping adapted to take substantially the entire load between a rim and a hub, said stamping comprising a bolting-on flange and outwardly of said flange including three annular zones, the inner zone comprising a dished disc portion of substantial radial and axial extent, the outer zone comprising short spokes of high section modulus and the intermediate zone constituting a merger of substantial axial extent between the inner and outer zones reinforced by said spokes and located by the diameter of the inner zone in a region of minor wheel stresses, said intermediate and inner zones combining to produce an axially facing channel having a radial depth at its mouth at least as great as the radial extent of the outer zone, and an annular reinforcing member tying together the outer portions of the intermediate zone between the spokes, said reinforcing member having arms aligning with and secured to the spokes and terminating at their outer extremities in rim seats.

CAROLUS L. EKSERGIAN.
PAUL W. GAENSSLE.